United States Patent [19]
Koyama et al.

[11] Patent Number: 5,280,646
[45] Date of Patent: Jan. 18, 1994

[54] PAGING DEVICE WITH STRUCTURE FOR REMOVING STATIC ELECTRICITY

[75] Inventors: Shunsuke Koyama; Takanori Miura; Teruhiko Fujisawa; Norio Hama, all of Suwa, Japan

[73] Assignee: Seiko Epson Corporation, Tokyo, Japan

[21] Appl. No.: 712,012

[22] Filed: Jun. 7, 1991

Related U.S. Application Data

[63] Continuation-in-part of Ser. No. 652,714, Feb. 8, 1991, which is a continuation of Ser. No. 326,346, Mar. 21, 1989, Pat. No. 5,072,231.

[30] Foreign Application Priority Data

Jun. 8, 1990 [JP] Japan .................. 2-150171
Jun. 11, 1990 [JP] Japan .................. 2-152387
Jun. 11, 1990 [JP] Japan .................. 2-152389
May 24, 1991 [JP] Japan .................. 3-120500

[51] Int. Cl.$^5$ .................. H01Q 1/22; H04B 1/16
[52] U.S. Cl. .................. 455/300; 343/701; 343/718; 455/283; 455/344
[58] Field of Search .......... 455/100, 274, 280, 281, 455/283, 284, 286, 287, 343, 344, 89, 82; 343/701, 702, 718, 846, 825.44; 340/825.44, 311.1

[56] References Cited

U.S. PATENT DOCUMENTS 4,214,211 7/1980 Yokogawa .................. 455/287
4,395,714 7/1983 Takeda et al. .............. 343/701 X
4,817,196 3/1989 MacNak et al. ............. 343/718 X
5,072,231 12/1991 Koyama .................... 343/718
5,134,724 7/1992 Gehring et al. ............ 455/274
5,135,694 8/1992 Akahane et al. ........... 264/138
5,152,693 10/1992 Matsui et al. ............. 439/37
5,179,733 1/1993 Matsui .................... 455/344

Primary Examiner—Reinhard J. Eisenzopf
Assistant Examiner—Chi Pham
Attorney, Agent, or Firm—Blum Kaplan

[57] ABSTRACT

The invention is directed to a wristwatch type paging device having a structure for preventing the intrusion of static electricity. The paging device is provided for receiving or transmitting signals A pager circuit is provided for controlling and operating on the received or signals to be transmitted. A pager body, having a two part wrist band coupled thereto, houses the pager circuit. The body is formed with at least a conductive portion. The band fastens around the wrist of the user and carries antenna portions. A fastener mechanically couples the end portions and electronically couples the antenna portions. The conductive portion of the pager body is set to the AC ground potential (the potential of one of the positive or negative electrodes of the battery). A balanced varactor diode circuit is provided between the antenna portion ends defining an essentially neutral point coupled to one of its positive and negative electrodes. When the conductive portion of the pager body contacts the user in a fitted state, the static electricity is prevented from entering the paging circuit. A spark gap may also be used to discharge the static electricity.

73 Claims, 10 Drawing Sheets

TO RECEIVER CIRCUIT BLOCK

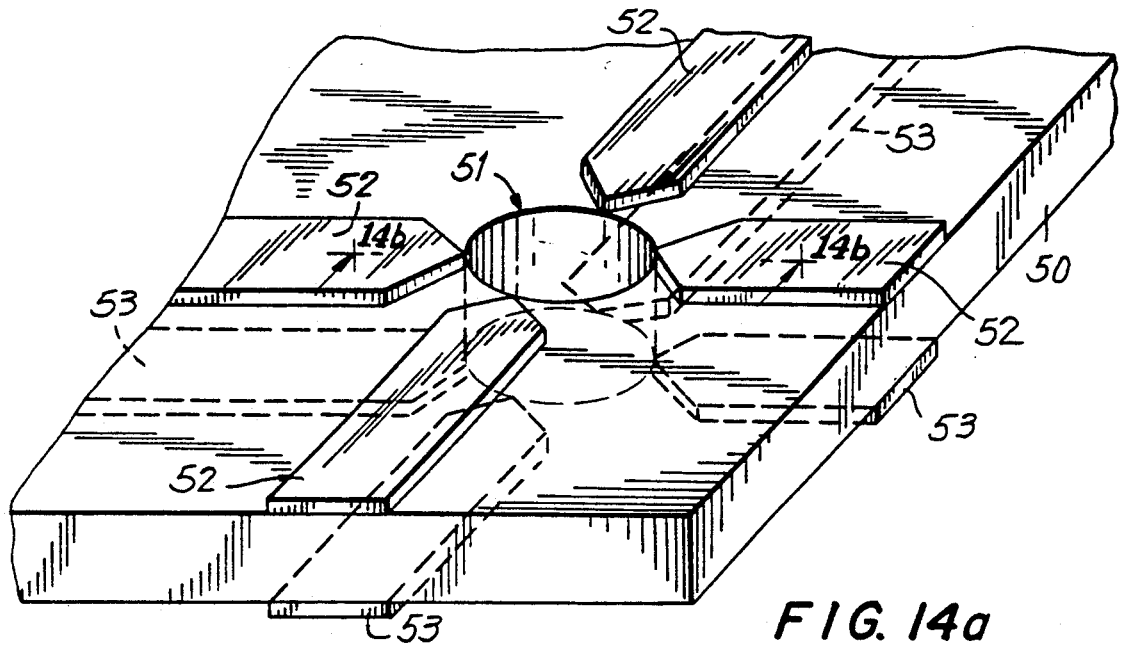
FIG. 14a
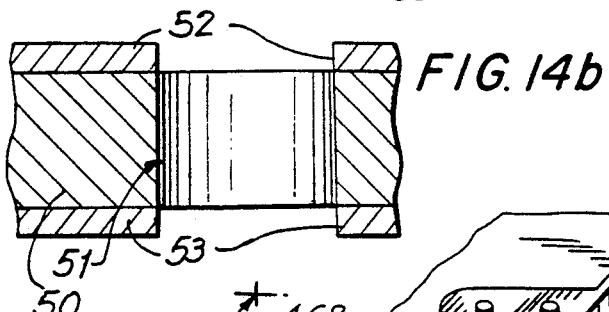
FIG. 14b
FIG. 15
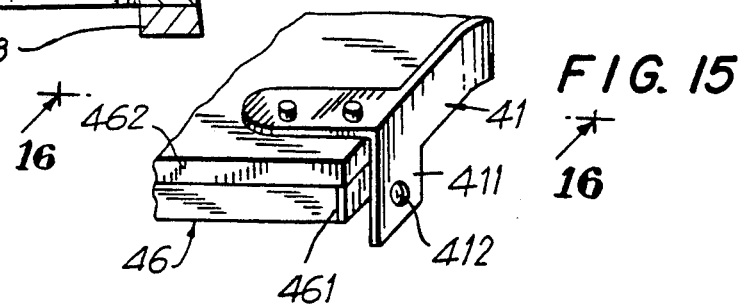
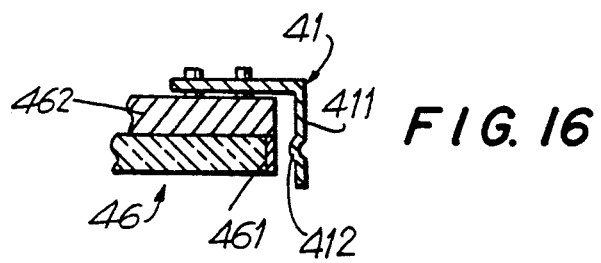
FIG. 16

FIG. 21 　　　FIG. 22
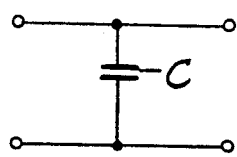  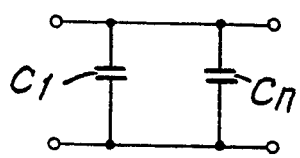
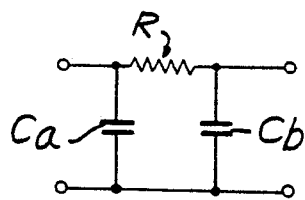  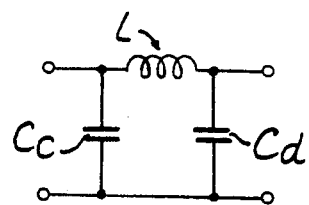
FIG. 23　　　FIG. 24
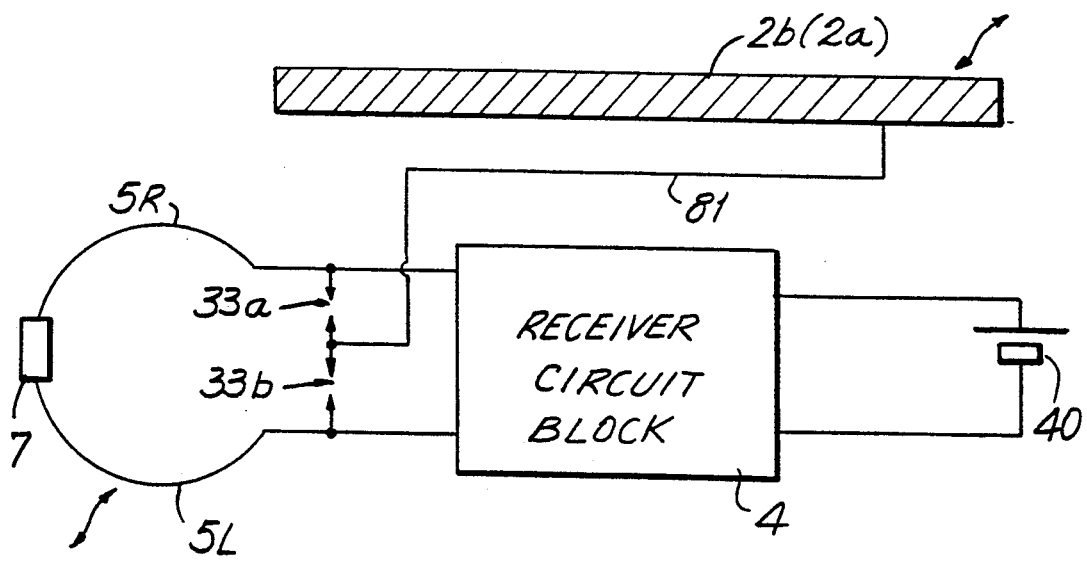
FIG. 25

PAGING DEVICE WITH STRUCTURE FOR REMOVING STATIC ELECTRICITY

CROSS REFERENCE TO RELATED APPLICATION

This Application is a continuation-in-part Application of U.S. patent application Ser. No. 07/652,714, filed Feb. 8, 1991, currently pending which is a continuation of U.S. patent application Ser. No. 07/326,346, now U.S. Pat. No. 5,072,231 filed on Mar. 21, 1989.

BACKGROUND OF THE INVENTION

The invention relates to a paging device such as a wristwatch type receiver and/or transmitter and, in particular to a wrist-fitted wireless set having a conductive portion which makes contact with the human body when fitted over a user's wrist and having a structure for preventing the intrusion of static electricity.

Wristwatch type receivers, also known as fitted wireless sets, pagers, selective call receivers or paging devices, have been manufactured over the past few years with various structural improvements including a reduction in both size and weight. For example, it has been proposed to use a band antenna such that a receiver antenna is built into a wrist hand for the purpose of reducing the size of the receiver body. It has also been proposed to form the body case or back lid of the receiver with a conductive member or material. In this manner, the body case or back lid has been utilized as a circuit component for the purpose of reducing the number of parts to be interconnected within the receiver body. Such devices can be configured as transmitters and/or receiver/transmitter sets.

When the wristwatch type pager is fitted over a user's wrist, fastening fixture is coupled to a loop antenna and a back lid; make contact with the human body. Since the fastening fixture and the back lid are each formed of conductive material, current distribution applied through the conductors forming the antenna circuit may be affected and changed based on the contact of those conductive components with the human body. Changes in the current distribution lower performance parameters of the wireless set such as gain of the antenna and a Q value of the antenna circuit. Accordingly, the sensitivity of the antenna also declines. In this configuration, it is difficult to provide an antenna mechanism and circuit arrangement which can operate within the range of desired frequencies. In fact, to date, no effective measures have been proposed to deal with a decline of sensitivity caused by the contact of the wireless set with the human body.

The contact of the wireless set with the human body also causes a circuit breakdown in the wireless set by an intrusion of static electricity from the human body. Referring to FIG. 3, a circuit is employed in accordance with the prior art as a measure to deal with the intrusion of static electricity. In this circuit, a diode 8 is serially connected to an antenna 5 so that static electricity entering from the antenna side is discharged through diode 8 to ground. Therefore, the static electricity is prevented from entering the side of an input amplifying circuit 9 connected at a downstream stage to the antenna circuit. However, the addition of diode 8 increases the capacitance of the circuit which resonates with the antenna to form an antenna tuning circuit. The increase in capacitance may render the circuit incapable of tuning to a particular frequency at which the tuning should be intrinsically achieved. Thus, to date, there have been no proposed no measures for effectively preventing the intrusion of static electricity which causes a decline of sensitivity of the receiver.

It is, therefore, desirable to provide a wrist-fitted wireless set which prevents a decline of sensitivity of the receiver caused by the contact of the receiver with the human body and prevents an adverse intrusion of static electricity to the receiver.

SUMMARY OF THE INVENTION

Generally speaking, in accordance with the invention, a paging device for at least one of receiving and transmitting signals is provided. A control device is provided for controlling at least one of the received signals and the transmitted signals. A pager body, formed at least in part of a conductive material, houses the control device. A mounting band is provided for coupling to the pager body and connecting to the user's body, for example, the user's wrist. The conductive portion of the pager body contacts the user's body when in a mounted state. The conductive portion of the pager body is set to the AC ground potential of the control device to thereby prevent the intrusion of static electricity into the paging device.

In another embodiment, the paging device is again provided for receiving and/or transmitting signals. A control device is provided for controlling either the received signals and/or the transmitted signals. A pager body is provided to house the control device. A band having two band portions including a first end and a second end is provided. The respective first end of the band portions is coupled to the pager body for fastening to a user. Antenna portions for receiving and/or transmitting signals are built into the band portions. A fastening means is connected to the second end of the respective band portions and electrically couples the antenna portions. In this manner, a loop antenna is formed when the pager body is fastened to the user's body, for example, the user's wrist. A circuit element is connected in parallel to the loop antenna having a capacitance to resonate with the loop antenna to form a tuning circuit. The circuit element is connected to the electrode of the control device. Finally, a discharge path is provided for removing the static electricity wherein the discharge path is formed from the fastening device to the electrode of the control device.

In still another embodiment of the invention, a paging device is again provided for receiving and/or transmitting signals. A control device is provided for processing the received signals and/or the transmitted signals. A pager body is provided for housing the control device. A band including two band portions having first ends and second ends is further provided. The first ends of the band portions are coupled to the pager body for fastening to the body of the user. An antenna is provided having a first section and a second section for receiving and/or transmitting signals built into the band portions. The antenna is formed of a conductive material. Finally, a fastening device is provided for connecting the second ends of the band portions and electrically coupling the first section and the second section of the antenna so that a loop antenna is formed with the pager body fastened to the user. The loop antenna includes a discharge path having at least one spark gap for removing static electricity.

In yet another embodiment of the invention, the paging device provided for receiving and/or transmitting signals includes a control device for controlling the received signals and/or the transmitted signals. The control device includes a first connection side and a second connection side. Again, a pager body is provided for housing the control device. A band is provided including two band portions having first ends and second ends. The first ends of the band portions are coupled to the pager body for fitting around the wrist of the user. An antenna is provided for receiving and transmitting the signals and is built into the band portions. A fastening device is provided for connecting the second ends of the band portions and electrically coupling the antenna so that a loop antenna is formed when the pager body is fastened around the user's wrist. A pair of spark gaps are connected in parallel to the loop antenna and are connected in parallel to the control device on the first connection side. Therefore, an essentially neutral point is formed between the two spark gaps. The neutral point is then coupled to the pager body by a dedicated wiring pattern. The body is also electrically coupled to a power supply device for supplying power to the paging device. Finally, a decoupling device is provided for separating the control device from the dedicated wiring pattern. The decoupling device is connected in parallel to the control device intermediate the control device and the power supply device.

Accordingly, it is an object of the invention to provide a paging device having a structure that prevents a decline in sensitivity of the receiver caused by a contact of the receiver with the human body.

Another object of the invention is to provide a structure of the paging device that prevents the adverse intrusion of static electricity into the paging device.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 14a is a fragmentary view showing another example of forming a spark gap for the embodiment of FIG. 11;

FIG. 14b is a cross-sectional view taken along lines 14b-14b of FIG. 14a;

FIG. 15 is a partial perspective view showing yet another example of forming a spark gap for the embodiment in FIG. 11;

FIG. 16 is a partial sectional view taken along lines 16—16 of FIG. 15;

FIG. 21 is a circuit diagram showing a decoupling circuit for the embodiment of FIG. 20;

FIG. 22 is a circuit diagram showing another example of a decoupling circuit of the embodiment of FIG. 20;

FIG. 23 is a circuit diagram of still another example of a decoupling circuit for the embodiment of FIG. 20;

FIG. 24 is a circuit diagram of yet another example of a decoupling circuit of the embodiment of FIG. 20; and FIG. 25 is a schematic block diagram showing another modification of the embodiment of FIG. 19.

DETAILED DESCRIPTION OF THE PREFERRED EMBODIMENT

The invention is directed to a wristwatch type receiver (i.e. a paper, a paging device or selective call receiver) having a structure for preventing the intrusion of static electricity. The wristwatch type receiver of the present invention is shown in FIGS. 1 and 2.

Figure 1:
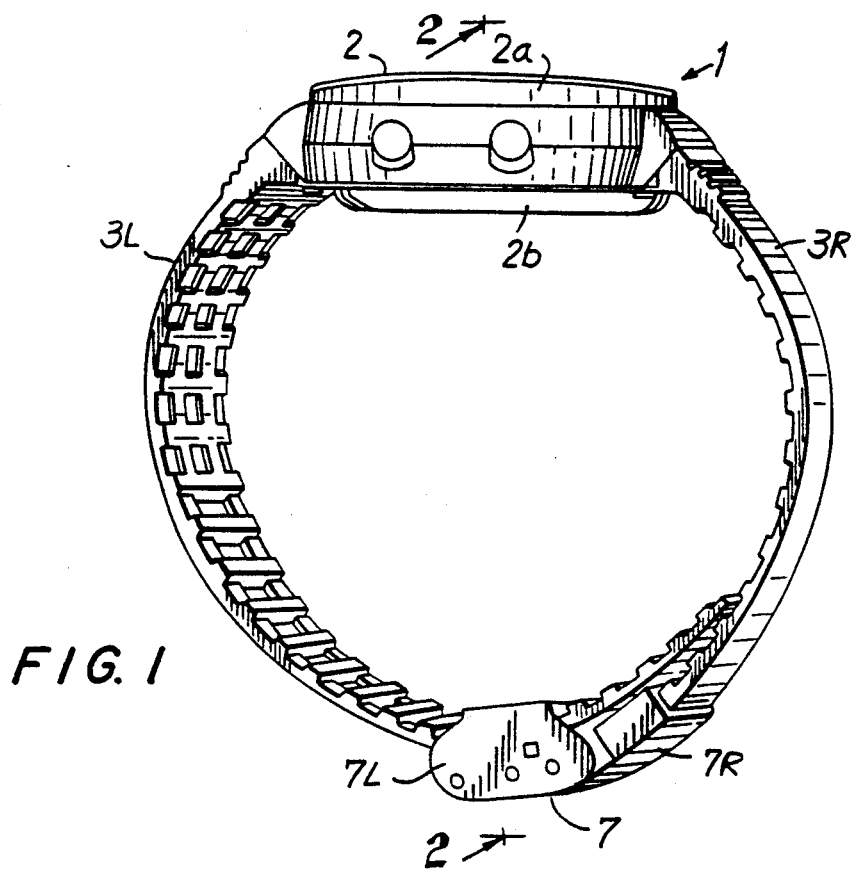
FIG. 1 is a perspective view of a paging device in accordance with the invention.
Figure 2:
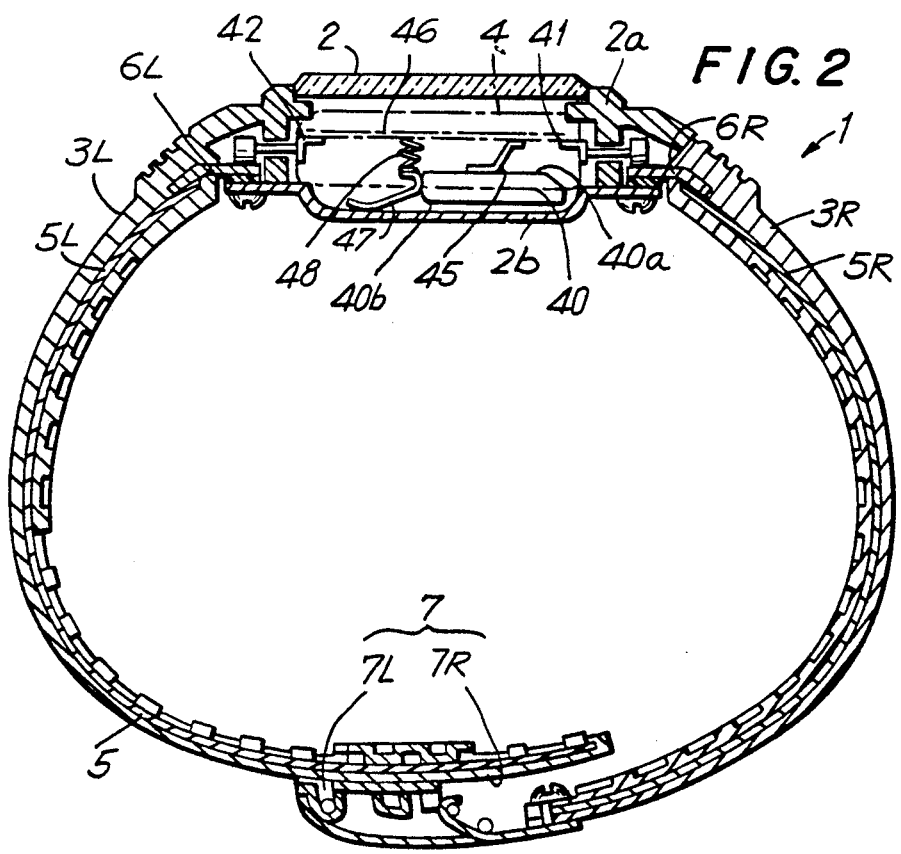
FIG. 2 is a cross-sectional view taken along lines 2—2 of FIG. 1.
Figure 3:
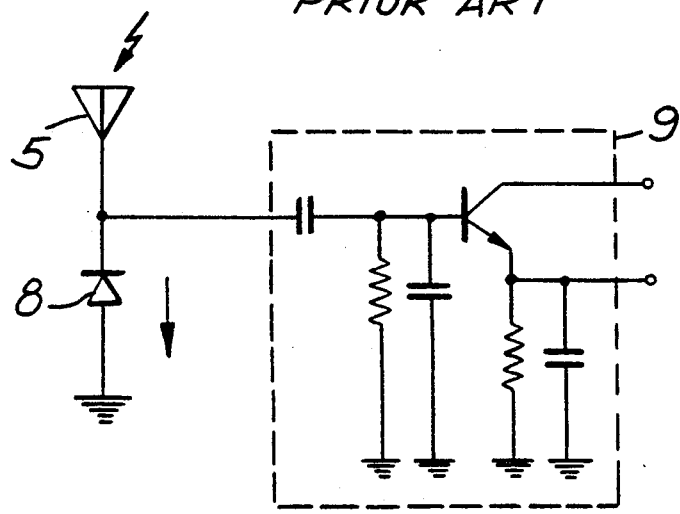
FIG. 3 is a schematic block diagram showing a circuit configuration for preventing the intrusion of static electricity in accordance with the prior art.

Referring to FIGS. 1 and 2, an example of the wristwatch type pager or a wireless set serving as a receiver and/or as a transmitter is shown in accordance with the present invention. In this embodiment, a wristwatch type pager 1 is provided with a receiver body 2 and a pair of bands 3R, 3L attached to opposite sides of receiver body 2. Receiver body 2 includes a case 2a, a back lid 2b, and a receiver circuit block 4 formed with a layered structure. Receiver circuit block 4 is disposed in a housing formed by case 2a and back lid 2b. In a conventional wristwatch type wireless set, a battery 40 is typically attached to receiver circuit block 4 on the side facing back lid 2b, so that the back lid can serve as an electrode for battery 40.

Bands 3R, 3L, formed of flexible resin material, include a pair of built-in antennas 5R, 5L constructed from conductive plates. At the proximal ends of antennas 5R, 5L, antenna terminals 6R, 6L respectively penetrate through the side walls of case 2a and project into the interior thereof. Antenna terminals 6R, 6L are respectively held in contact with antenna input terminal electrodes 41, 42 formed on the sides of receiver circuit block 4. An engaging metal fixture 7R and a receiving metal fixture 7L are each formed of conductive material. Engaging metal fixture 7R and receiving metal fixture 7L are attached to the distal ends of bands 3R, 3L respectively, and are coupled to the distal ends of antennas 5R, 5L respectively to form an intermediate fastening fixture 7 between antennas 5R, 5L which also serves to hold wristwatch type pager 1 on the user's wrist. Wristwatch type pager 1 is fitted over a user's wrist by interconnecting bands 3R, 3L with intermediate fastening fixture 7. At the same time, a loop antenna 5 is also formed by the pair of antennas 5R, 5L connected with each other through intermediate fastening fixture 7.

Receiver circuit block 4 is designed with multiple layers of circuit boards stacked one upon another with a spacer positioned between each pair of adjacent layers. A battery 40, which is typically a thin button battery, is attached on the interior side of back lid 2b for the purpose of reducing the dead weight of the receiver. A negative electrode 40a of battery 40 is connected through an electrode plate 47 and back lid 2b to a negative side electrode pattern (not shown) formed on a circuit board 46 as an integral element of receiver circuit block 4. A positive electrode 40b of battery 40 is connected through an electrode plate 45 in the form of a leaf spring and an electrode plate 48 in the form of a coiled spring to a positive side electrode pattern (not shown) formed on circuit board 46. Since electrode plate 47 contacts back lid 2b, the latter serves as a part of the power supply circuit.

Figure 4:
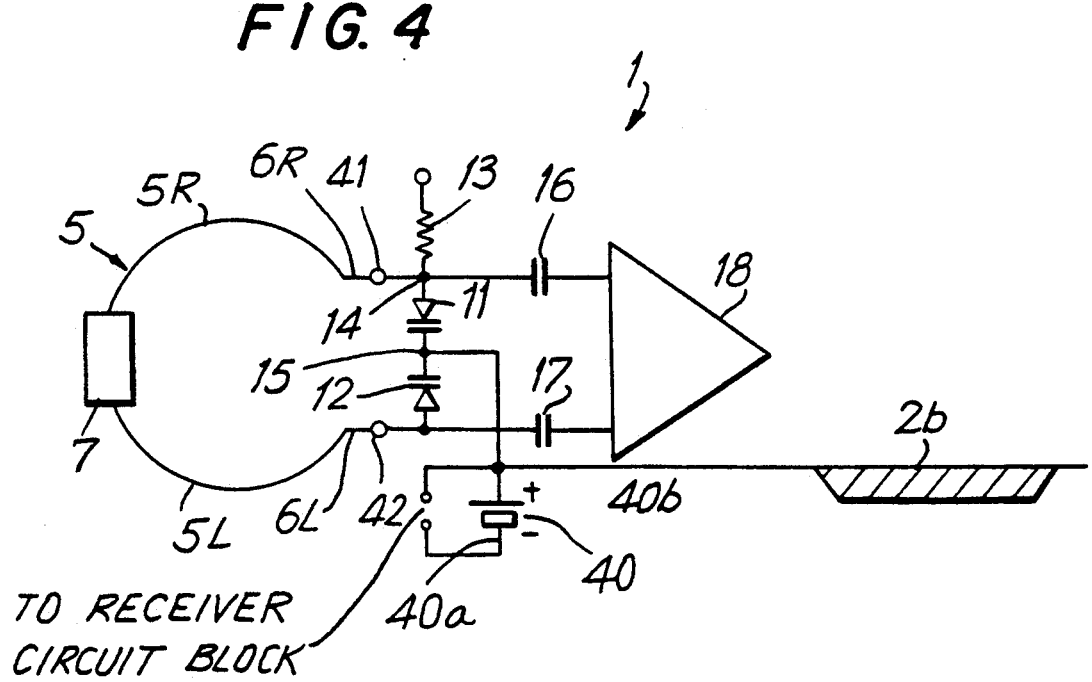
FIG. 4 is a schematic block diagram showing the circuit configuration of a first embodiment of the invention.

Reference is first made to FIG. 4 of the drawings which depicts a configuration of a receiver circuit in which intermediate fastening fixture 7 of loop antenna 5 for wristwatch type pager receiver 1 is set to the AC (Alternating Current) ground potential. In the first embodiment, a resonance circuit is designed with a pair of varactor diodes 11, 12 connected in parallel with loop antenna 5. Varactor diodes 11, 12 are connected to each other at their cathodes. A resistor 13 is connected at a junction 14 between an anode of varactor diode 11 and an antenna input terminal electrode 41. The tuning frequency control voltage is applied to the resonance circuit through resistor 13. A positive electrode 40b of power supply battery 40 of receiver 1 is connected at a junction 15 between the cathodes of varactor diodes 11, 12. This connection is made through a positive side electrode pattern formed on circuit board 45 of receiver block circuit 4. In another embodiment, junction 15 may be directly connected to positive electrode 40b of battery 40.

In this embodiment, varactor diodes 11, 12 have the same characteristics as those found in an FM receiver or the like and are usually incorporated into a single package. Since the capacitances of varactor diodes 11, 12 are thus equal to each other, the resonance circuit comprising loop antenna 5 and varactor diodes 11, 12 form a balanced circuit. The position of intermediate fastening fixture 7 and the position of junction 15 between varactor diodes 11, 12 serve each as an essentially neutral point. Since junction 15 is connected to positive electrode 40b of battery 40, the potential at junction 15 is set to the ground potential in terms of the AC technique. At the same time, intermediate fastening fixture 7 serves as the neutral point on the other side of pager 1 so that the potential is set to the ground potential also in terms of the AC technique. The resonance circuit is connected on the downstream side to an RF amplification circuit 18 through coupling capacitors 16, 17.

Back lid 2b is also coupled to positive electrode 40b of battery 40, and therefore is at its ground potential in accordance with the AC technique. When pager 1 is fitted over a user's wrist, back lid 2b and intermediate fastening fixture 7 contact the skin surface of the user's wrist. Since back lid 2b is formed of conductive material and connected to the ground potential of the circuit, the wrist is also connected to the ground potential of the circuit through back lid 2b. As a result, the potential established by the wrist of the user is fixed to the ground potential. Therefore, even though back lid 2b is formed of conductive material and contacts the skin surface of the wrist, an electrically detrimental influence will not directly act on the receiver circuit.

Further, since back lid 2b is set to the ground potential, an electrostatic coupling between the wrist and the receiver circuit is interrupted by the grounding of back lid 2b. On the other hand, since intermediate fastening fixture 7 is also connected to the ground potential, the receiver circuit will not be adversely affected even with intermediate fastening fixture 7 contacting the skin surface of the wrist. In this embodiment, the wrist is set to the ground potential on the circuit upon contact with back lid 2b, so that no appreciable detrimental influences occur.

Since back lid 2b and intermediate fastening fixture 7 are set to the ground potential in the circuit, the receiver circuit will not be adversely affected. Consequently, sensitivity and other characteristics of the receiver can be held at an desired level.

Figure 5:
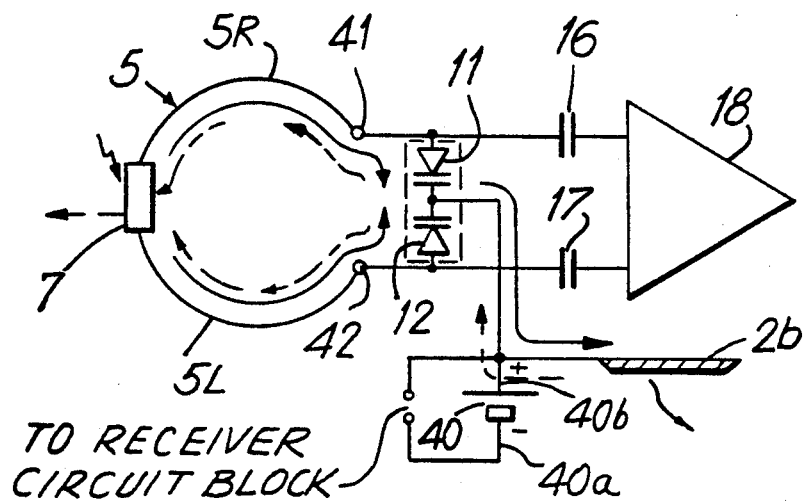
FIG. 5 is a schematic block diagram showing a discharge path for removing static electricity in the circuit of FIG. 4.

When pager 1 is fitted over the user's wrist, static electricity may enter the interior of the receiver circuit from the wrist side through back lid 2b and intermediate fastening fixture 7 each formed of conductive material. As shown in FIG. 5, static electricity can enter both back lid 2b and intermediate fastening fixture 7 when held in a fastened state. When static electricity enters from intermediate fastening fixture 7, the static electricity is discharged to the exterior by a discharge path passing through loop antenna 5 (5R, 5L), varactor diodes 11, 12 and back lid 2b as indicated by solid arrows in FIG. 5. Conversely, when static electricity flows through the above discharge path in a reverse direction, the static electricity is discharged to the exterior by intermediate fastening fixture 7 as indicated by dashed arrows in FIG. 5. In either case, no static electricity will enter RF amplification circuit 18.

Figure 6:
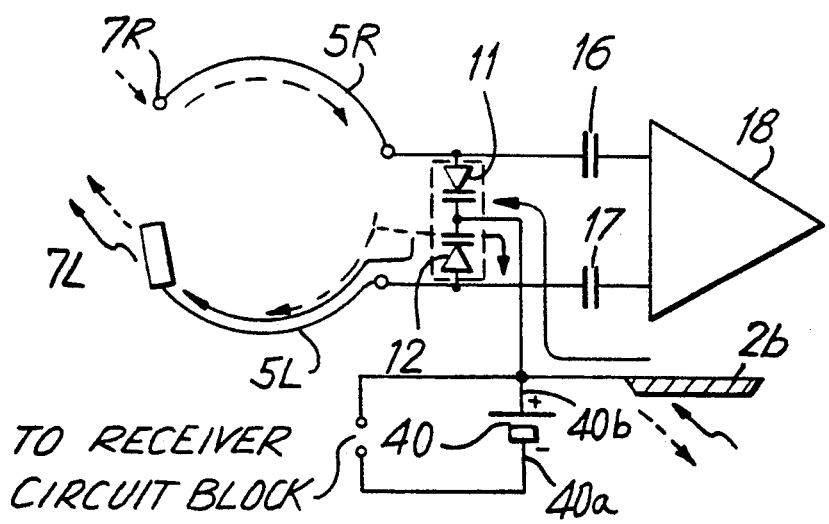
FIG. 6 is a schematic block diagram showing another discharge path for removing static electricity in the circuit of FIG. 4.

When intermediate fastening fixture 7 is not fastened, a different discharge path is followed as shown in FIG. 6. The static electricity entering from back lid 2b is discharged to the exterior through varactor diodes 11, 12 and fixture 7R or 7L depending on which is positioned on the ground side. In FIG. 6, the static electricity is discharged through fixture 7L as shown by the solid arrows, since it is positioned on the grounded side. Further, the static electricity entering from fixture 7R is discharged as shown by the dashed arrows to the exterior through varactor diodes 11, 12 from either fixture 7L and back lid 2b, both of which are grounded.

Accordingly, since the discharge path is formed in the antenna resonance circuit, the static electricity entering from the user's body, for example, the user's wrist, will not enter the interior of the receiver circuit. Rather, the static electricity is positively discharged to the exterior. Therefore, it is possible to prevent an electrostatic breakdown of any elements of the internal circuit.

Figure 7:
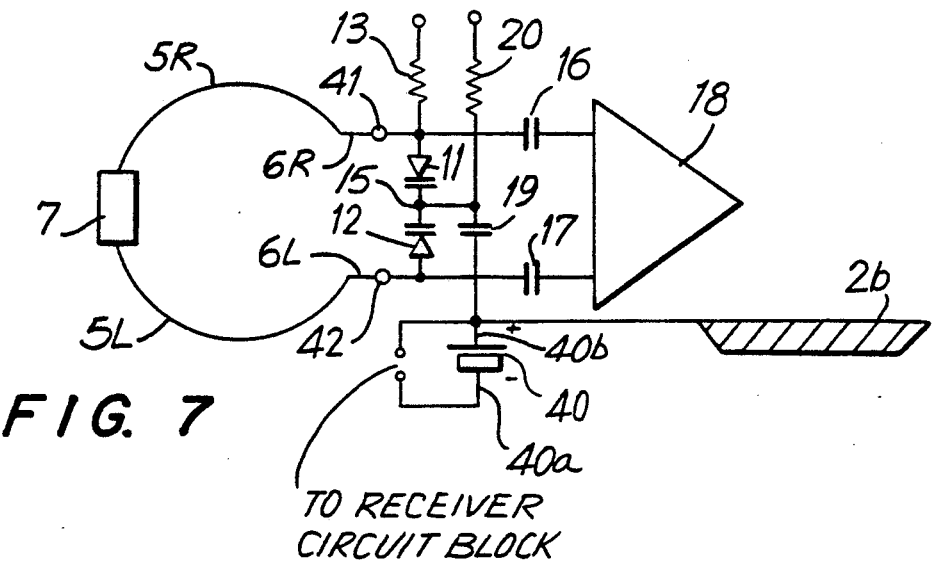
FIG. 7 is a schematic block diagram with a modification to the embodiment shown in FIG. 4.
Figure 8:
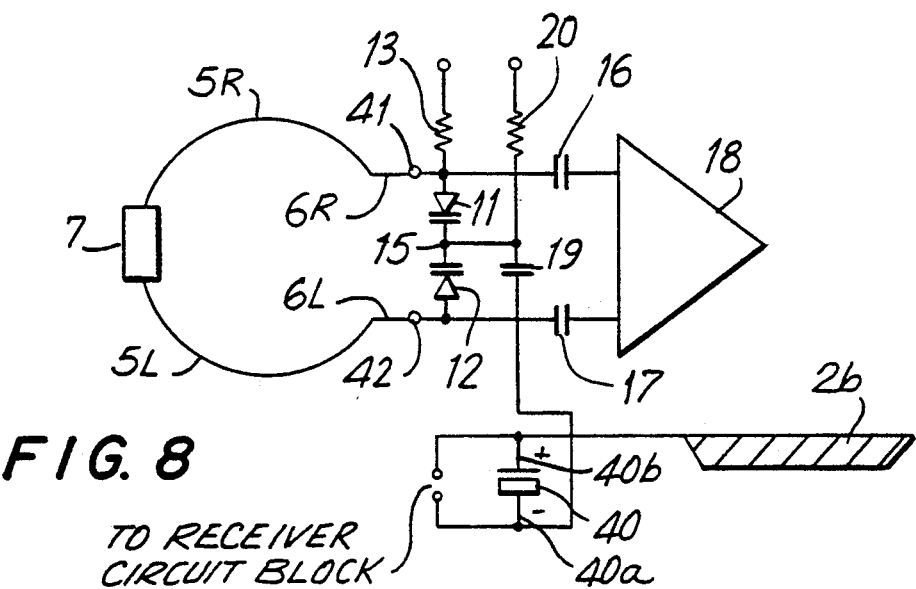
FIG. 8 is a schematic block diagram showing another modification to the embodiment shown in FIG. 4.
Figure 9:
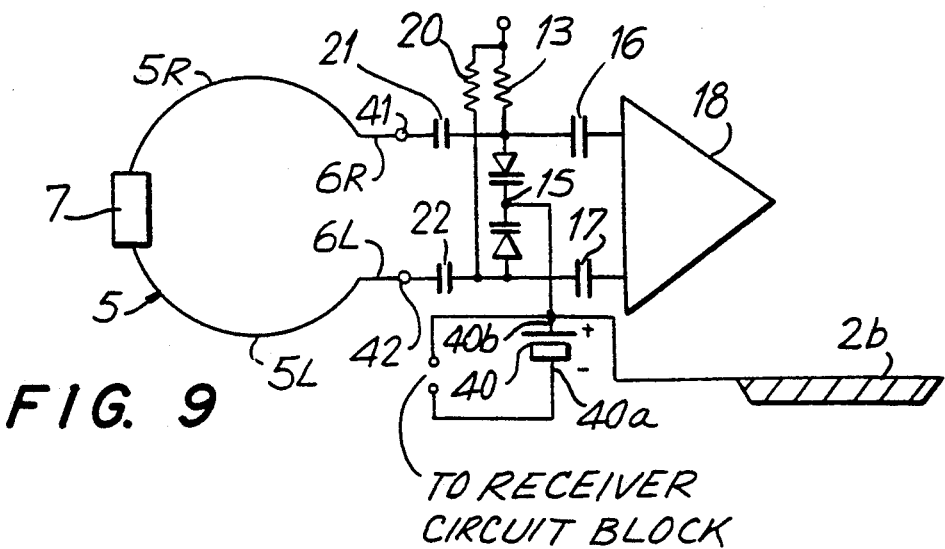
FIG. 9 is a schematic block diagram showing still another modification to the embodiment shown in FIG. 4

Reference is now made to FIGS. 7, 8 and 9 which depict modifications to FIG. 4. Accordingly, a description of like parts which are depicted by like numerals is omitted and a description thereof is incorporated herein by reference. In FIG. 7, junction 15 is again positioned between varactor diodes 11, 12. Junction 15 is connected through a bypass capacitor 19 to the positive terminal of battery 40 so that junction 15 is grounded to the ground potential in terms of the AC technique. In this embodiment, the tuning frequency control voltage is applied to junction 15 through a resistor 20. The voltage applied through the resistor 13 may be either a fixed voltage or a variable voltage. If a fixed voltage is applied, resistor 13 only needs to be connected to the negative electrode of the battery 40, by way of example.

In FIG. 8, junction 15 is again positioned between varactor diodes 11, 12 and is connected to negative electrode 40a of battery 40 through bypass capacitor 19. In FIG. 9, capacitors 21, 22 are inserted between antenna input terminal electrodes 41, 42, respectively, which each depict a terminal of loop antenna 5, and the respective anodes of varactor diodes 11, 12. Capacitors 21, 22 thereby separate loop antenna 5 and varactor 11, 12 in diodes terms of a DC technique. Capacitors 21, 22, which have the same constants, are serially connected to the respective diodes to form a balanced circuit. In this embodiment, the control voltage is applied to the anodes of varactor diodes 11, 12 through resistors 13, 20, respectively. The embodiments disclosed in FIGS. 7, 8 and 9 attain a similar advantage attained by that in the embodiment shown in FIG. 4.

In the above embodiments, case 2a and back lid 2b form receiver body 2, but only back lid 2b is formed of conductive material. However, case 2a may be also formed of conductive material. In this embodiment, case 2a is set to the ground potential. Therefore, since the receiver circuit is completely covered by case 2a and back lid 2b, the receiver circuit is at the ground potential. Accordingly, the receiver circuit is protected against static electricity. Since noises produced on the side of the receiver circuit are interrupted, the external sensitivity of the loop antenna of the receiver circuit is increased. Thus, the sensitivity of loop antenna 5 is improved by removing the drawback caused by the reception of noise.

Figure 10:
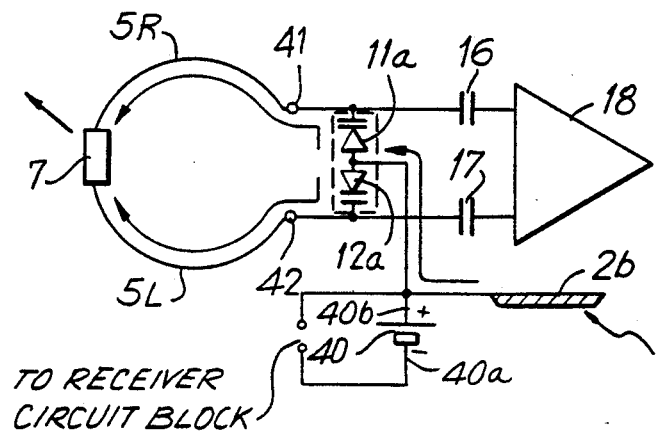
FIG. 10 is a schematic block diagram showing yet still another modification to the embodiment shown in FIG. 4.

Referring now to FIG. 10, varactor diodes 11a, 12a are serially connected to each other at their anodes, rather than their cathodes as set forth in the above embodiments. In this embodiment, loop antenna 5 and varactor diodes 11, 12 form a balanced circuit with the result being similar to that attained in the previous embodiments.

Figure 11:
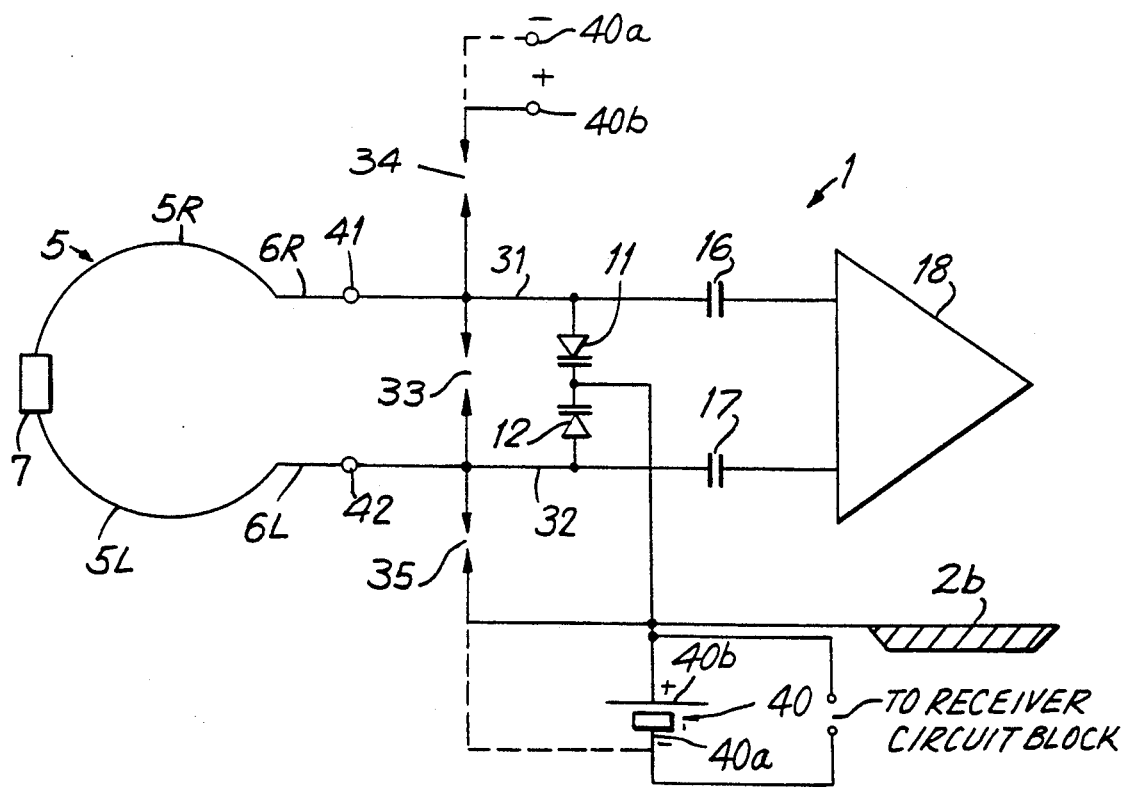
FIG. 11 is a schematic block diagram showing the circuit configuration of a second embodiment in accordance with the invention.

Reference is now made to FIG. 11 which schematically shows an antenna circuit section of the receiver according to a second embodiment of the invention. In pager 1, a discharge path including spark gaps is formed in the antenna circuit section. A first spark gap 33 is formed between a line 31 connecting antenna input terminal electrode 41 to the anode of varactor diode 11 and a line 32 connecting antenna input terminal electrode 42 to the anode of varactor diode 12. In addition, a second spark gap 34 is formed between line 31 and positive electrode 40b of battery 40. Similarly, a third spark gap 35 is formed between line 32 and positive electrode 40b of battery 40.

In this configuration, when intermediate fastening fixture 7 is unfastened and static electricity enters the receiver circuit from either fastening fixture 7R or 7L, a dielectric breakdown is caused at first spark gap 33. The dielectric breakdown creates conduction across spark gap 33 as if fastening fixture 7L or 7R (i.e., which ever fastening fixture the static electricity does not enter) is grounded. As a result, a discharge path extends from antenna 5R or 5L, depending on which antenna the static electricity enters, to the opposite grounded antenna 5L or 5R through first spark gap 33.

At another time, a dielectric breakdown is caused at second spark gap 34 or third spark gap 35 to create a conduction across the respective gap, thereby forming a discharge path which extends from one antenna to back lid 2b or battery 40 through second spark gap 34 or third spark gap 35. As a result, static electricity entering the antenna circuit can be prevented from further entering the input side of RF amplification circuit 18.

When intermediate fastening fixture 7 is fastened, the static electricity entering from intermediate fastening fixture 7 flows to back lid 2b or battery 40 through second spark gap 34 or third spark gap 35. Therefore, the static electricity will not cause any damage or malfunction to the circuit.

When static electricity enters the antenna circuit from back lid 2b, the static electricity flows through second spark gap 34 or third spark gap 35 in a direction opposite to the direction of when the static electricity enters through fastening fixture 7R or 7L. Accordingly, the static electricity is discharged to the exterior by intermediate fastening fixture 7. Alternatively, second spark gap 34 and third spark gap 35 may be formed between lines 31 and 32 and negative electrode 40a of battery 40, respectively, as indicated by dashed lines in FIG. 11. As a result, static electricity is prevented from causing damage or malfunction to RF amplification circuit 18.

The method of forming spark gaps 33, 34 and 35 will now be described in detail. The following description will be made with respect to first spark gap 33 as an example. However, the formation of second spark gap 34 and third spark gap 35 is the same if not specified otherwise.

Figure 12:
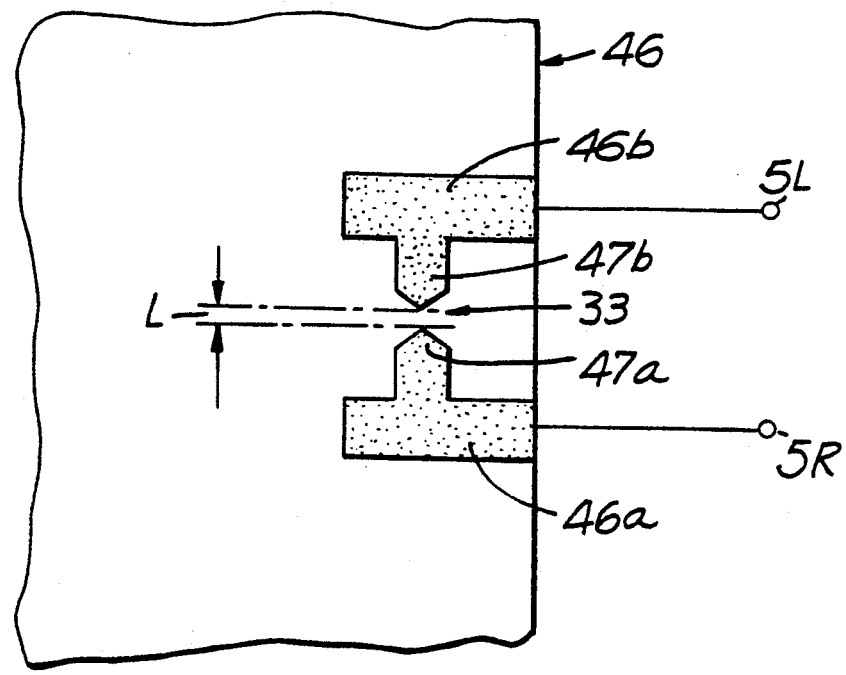
FIG. 12 is a fragmentary view of a spark gap for removing static electricity of the embodiment shown in FIG. 11.
Figure 13:
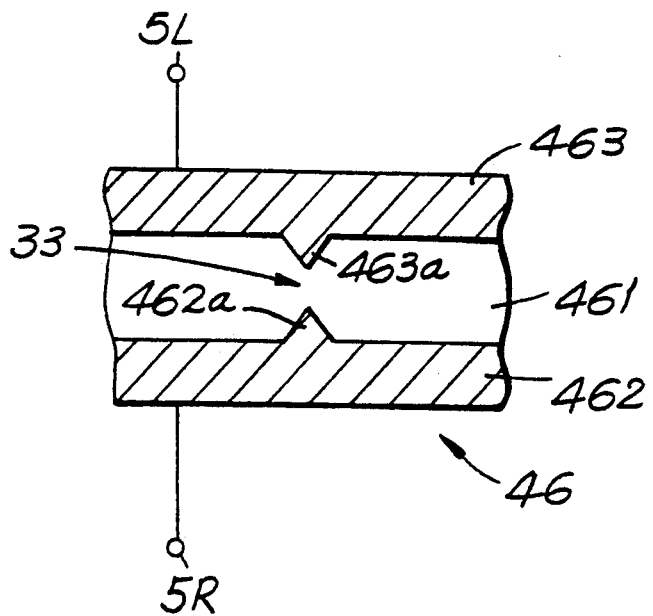
FIG. 13 is a fragmentary view showing a spark gap in accordance with another embodiment shown in FIG. 11.

Initially, first spark gap 33 is formed by designing shapes on surface electrode patterns 46a, 46b respectively. Surface electrode patterns 46a, 46b connect to antennas 5R, 5L, on circuit board 46 as a integral element of circuit block 4 of the receiver as shown in FIG. 12. More specifically, pointed tip portions 47a, 47b are respectively positioned on surface electrode patterns 46a, 46b to face each other. A space L is set at a distance between pointed tip portions 47a, 47b. Space L is set so as to start discharging at a target voltage. Spark gap 33 is preferably arranged on circuit board 46 in a position so that other parts are not affected, as by forming pointed tip portions 47a, 47b in an end area of circuit board 46.

Where circuit board 46 is formed with a multilayered structure, first spark gap 33 may be formed between two layers stacked one above the other on circuit board 46. Referring to FIG. 13, when circuit board 46 has conductive layers 462, 463 laminated with a peripheral insulating layer 461 therebetween, spark gap 33 can be formed by providing pointed tip portions 462a and 463a to project upwards and downwards respectively. Conductive layers 462, 463 are connected to antennas 5R, 5L respectively. In this arrangement, since the formation of the spark gap hardly takes up space on the board surfaces, the advantage created by the packing efficiency of the circuit board will not be diminished.

In an alternative embodiment, as shown in FIGS. 14a and 14b through hole 51 is bored through one circuit board 50 of the multi-layered structure of receiver circuit block 4. An electrode pattern 52 acting as a conductive layer is coated on the side of circuit board 50 where the top portion of a through hole 51 is positioned. Electrode pattern 52 includes pointed tips directed toward and terminating at the edge of through hole 51. At the same time, an electrode pattern 53 acting as a conductive layer is coated on the side of circuit board 50 where the bottom portion of through hole 51 is positioned. Similarly, electrode pattern 52 includes pointed tips directed toward and terminating of the edge of through hole 51. In this manner, a spark gap is formed between upper electrode pattern 52 and lower electrode pattern 53 each having a pointed tip shape.

In still another embodiment, the spark gap may be positioned on the lateral surface of the circuit board as shown in FIGS. 15 and 16. In FIGS. 15 and 16, the formation of antenna input terminal electrode plate 41 is shown. Antenna input terminal electrode plate 4 is formed identical thereto. Electrode plate 4 is formed with a vertical portion 411 confronting the lateral surface of circuit board 46. Vertical portion 411, is formed with a projection 412 which projects toward the lateral surface of circuit board 46. Confronting projection 412 on the lateral surface of circuit board 46 is an exposed electrode pattern 461. Electrode pattern 461 is connected to the positive or negative electrode of the circuit. With this arrangement, spark gap 33 is formed between projection 412 and electrode pattern 461.

Figure 17:
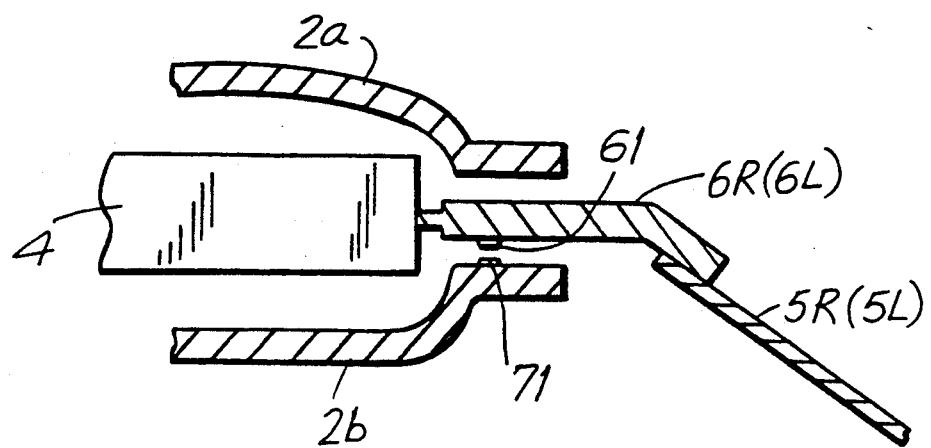
FIG. 17 is a fragmentary sectional view of still a further example of forming of spark gap for the embodiment of FIG. 11.

Reference is now made to FIG. 17 which depicts the structure of second spark gap 34 and third spark gap 35 formed between back lid 2b and antenna 5. The formation of spark gaps 34, 35 is the same with respect to antennas 5R, 5L and antenna input terminals 6R, 6L, respectively. Therefore, the discussion thereof and the drawings will be directed to both configurations. Spark gaps 34, 35 are formed by projections 61, 71 formed on the confronting surfaces of input terminal 6R(6L) of antenna 5R(5L) and back lid 2b, respectively. By arranging spark gaps 34, 35 at this location, the degree of freedom in designing the board pattern is increased as compared with the case of arranging the spark gap on the circuit board.

Figure 18:
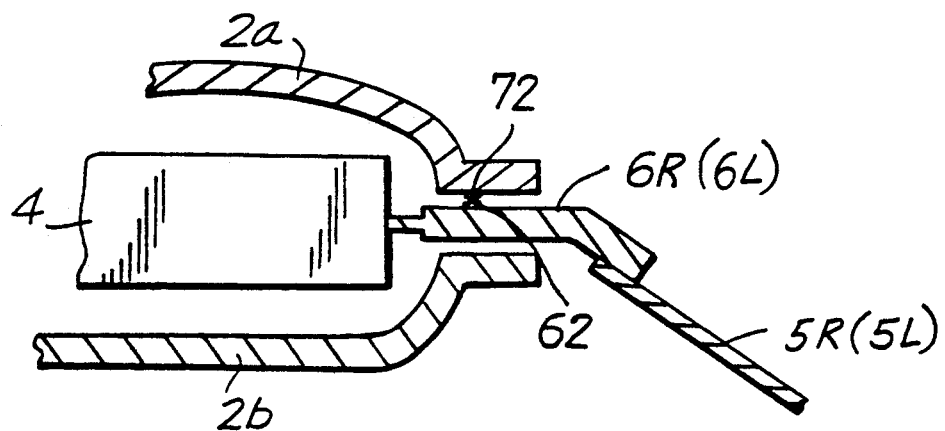
FIG. 18 is a fragmentary sectional view of yet still another example of forming a spark gap for the embodiment of FIG. 11.

When case 2a is formed of conductive material, as shown in FIG. 18, spark gap 34, 35 may be provided by projections 62, 72 formed on respective confronting surfaces of antenna input terminal 6R (6L) and case 2a. Case 2a has a through hole 73 which antenna input terminal 6R (6L) penetrates.

Figure 19:
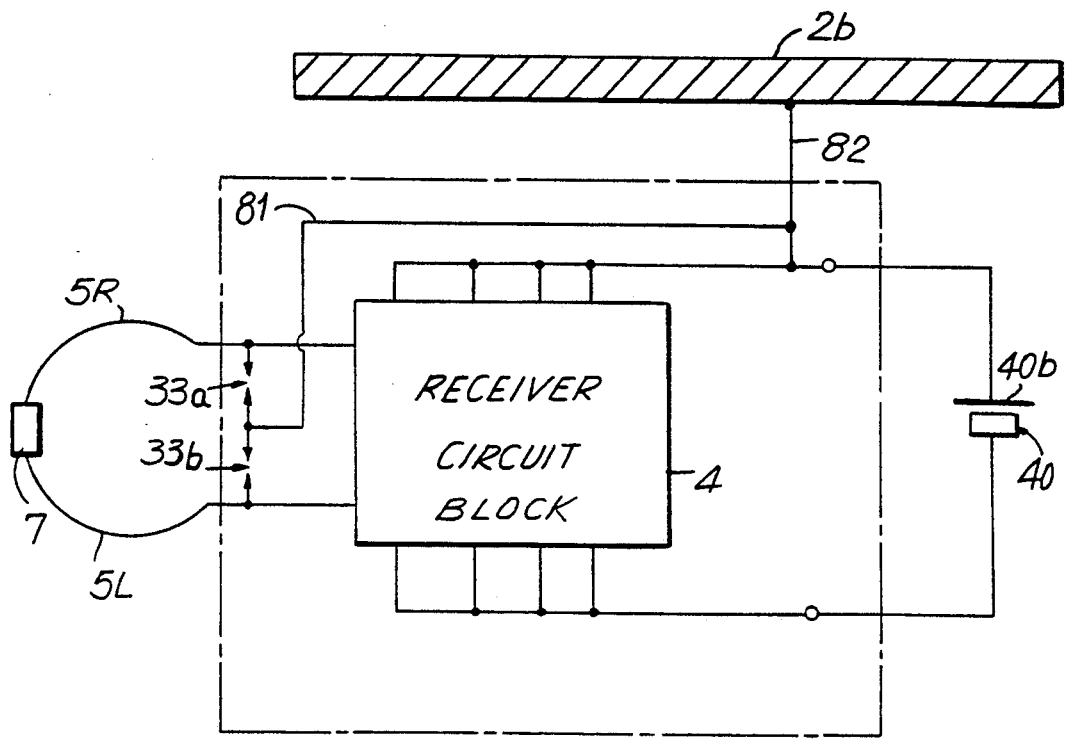
FIG. 19 is a schematic block diagram of a third embodiment in accordance with the invention.

Reference is now made to FIG. 19 which depicts a third embodiment of the invention. In FIG. 19, a circuit configuration includes a pair of spark gaps 33a, 33b formed between antennas 5R and 5L. The junction between spark gaps 33a, 33b are connected to back lid 2b through a dedicated wiring pattern 81. Wiring pattern 81 is independent of the power supply pattern and the ground pattern in the receiver circuit. In this configuration, back lid 2b is connected to negative electrode 40b of battery 40 through a wiring pattern 82. While at the same time, dedicated wiring pattern 81 is connected to wiring pattern 82. When case 2a is formed of conductive material, wiring pattern 81 is only required to be connected to case 2a. In addition, when back lid 2b or case 2a is connected to negative electrode 40b of battery 40 through wiring pattern 82, dedicated wiring pattern 81 is only required to be connected to a wiring used for the connection therebetween. Accordingly, this circuit configuration provides the similar advantage to that attained in the first and second embodiment.

Figure 20:
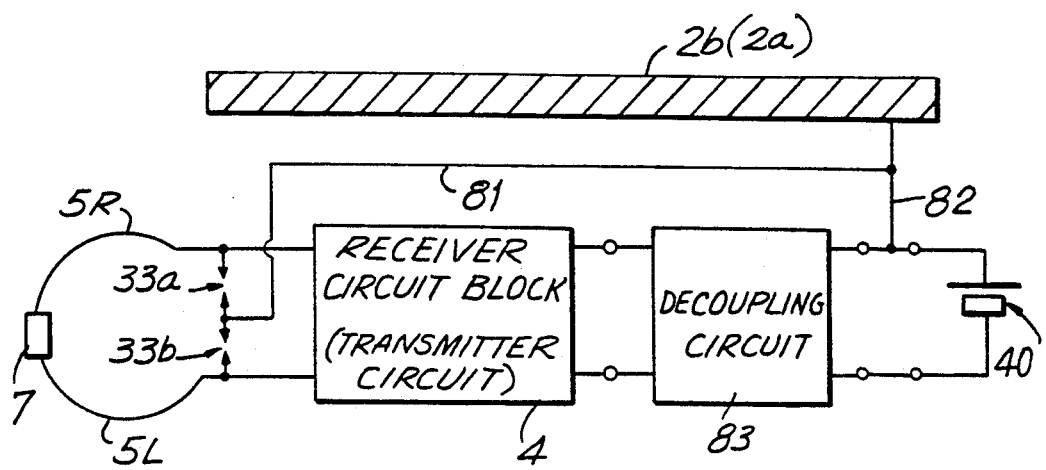
FIG. 20 is a schematic block diagram depicting a modification of the embodiment of FIG. 19.

In order to separate the connecting side of receiver circuit block 4 (which may also include a transmitting circuit) from a discharge path defined by the wiring patterns 81, 82 from static electricity, a decoupling circuit 83 is disposed therebetween as shown in FIG. 20. Decoupling circuit 83 is formed by any of various circuit configurations shown in FIGS. 21, 22, 23 and 24. In FIG. 21, decoupling circuit 83 is formed by a single capacitor C in parallel with receiver circuit block 4. In FIG. 22, decoupling circuit 33 is formed by multiple capacitors C1–Cn in parallel with receiver circuit block 4. In FIG. 23, the decoupling circuit is formed by a filter constructed with a resistor R1 and two capacitors Ca and Cb. The capacitors are in parallel with receiver circuit block 4 while the resistor is in series therewith between capacitors Ca, Cb. In FIG. 24, the decoupling circuit is formed by a filter in parallel with receiver circuit block 4. The filter is constructed by an inductor L in series with receiver circuit block 4 and two capacitors Cc and Cd on opposed sides of inductor L in parallel with receiver circuit block 4. When back lid 2b or case 2a is disconnected from the side of battery 40 as shown in FIG. 25, a discharge path can be formed through spark gaps 33 between loop antenna 5 and back lid 2b.

The above embodiments have been applied to a wristwatch type receiver. However, the invention is applicable to other types of wrist-fitted wireless sets as well. For example, the invention may be applied to a wrist-fitted wireless set having a transmitting function. While most of the above embodiments have been explained as connecting the back lid to the positive electrode of the circuit, the same benefit may be obtained by connecting the back lid to the negative electrode of the circuit.

In the wrist-fitted wireless set according to the invention, a back lid of the case, an intermediate fastening member or other member of the wireless set may each be formed of conductive material. In this manner, the wireless set is set to the AC ground potential when the wireless set is fitted over a user's wrist. Even though the conductive portion contacts the human body, any adverse electrical influences will not act on the RF amplification circuit. Therefore, it is possible to avoid a deterioration of the receiver characteristics including reception sensitivity caused by the contact with the human body.

Further, the wrist-fitted wireless set includes a circuit element having capacitance to resonate with the loop antenna built in the wrist band to form a tuning circuit. Therefore, the antenna tuning circuit is connected to a positive or negative electrode of the wireless set circuit when the wireless set is fitted over the user's wrist. In this manner, a discharge path for removing static electricity is formed between the intermediate fastening member and the electrode through the circuit element.

When static electricity enters the loop antenna from the intermediate fastening portion upon the contact with the human body, the intrusive static electricity is discharged to the ground side through the discharge path including the circuit element. As a result thereof, static electricity produced by the human body is eliminated, thereby reducing the damage caused to the wireless set circuit or eliminating one of the many causes of malfunction. The discharge path requires only minimum additional circuit elements which permit the capacitance of the antenna tuning circuit to not fluctuate. In addition, it will maintain the antenna receiving and transmitting characteristics.

Moreover, in the wrist-fitted wireless set, the discharge path for removing static electricity entering from the human body side may be eliminated by a spark gap. By incorporating a spark gap into the receiver circuit, the static electricity is reliably eliminated and thereby removing the fear of damage or malfunction to the circuit.

Accordingly, the wrist-fitted wireless set of the invention is provided with a discharge path formed by a spark gap. The discharge path is electrically interrupted at the spark gap in a normal operating state. Therefore, the antenna characteristics such as capacitance of the tuning circuit of the loop antenna will not fluctuate due to the formation of the discharge path.

To achieve the objectives of the invention of preventing a decline of sensitivity of the receiver, the wrist-fitted wireless set includes a portion formed of conductive material which contacts the human body s that the wrist-fitted state of the built-in circuit of the wireless is set to AC ground potential. In the preferred embodiments, the case of a wireless set body or a back lid of the case is formed of a conductive material. The portion formed of conductive material is set to the AC ground potential by connecting it directly or indirectly through another conductive member to the AC ground electrode of the wireless set circuit.

The wrist-fitted wireless set is provided with an antenna built into the band portions. The bands constructed with a conductive material are coupled to each other by an intermediate fastening member to form a loop antenna when the wireless set is fitted around a user's wrist. The portion formed of conductive material may be connected to an essentially neutral point in a balanced circuit section formed by the loop antenna. In the preferred embodiment, the intermediate fastening member is also connected to the essentially neutral point in the balanced circuit section.

Accordingly, the wrist-fitted wireless set is arranged such that the back lid of the case, the intermediate fastening member or other member all formed of conductive material, are set to the AC ground potential of the wireless set circuit when the wireless set is fitted over the user's wrist. Therefore, when the conductive portion contacts the human body, an adverse electric influence will hardly effect the wireless set circuit. As a result thereof, the contact with the human body by the wrist-fitted wireless set will not substantially deteriorate the characteristics of the receiver, such as reception sensitivity.

To further prevent the adverse intrusion of static electricity, the wrist-fitted wireless set is arranged such that a circuit element is connected in parallel to the loop antenna. Therefore, the wrist-fitted wireless set has the capacitance to resonate with the loop antenna to form an antenna tuning circuit. Further, the loop antenna is directly or indirectly connected to a positive or negative electrode of the wireless set circuit so that a discharge path for static electricity is formed between the intermediate fastening member and the electrode through a circuit element.

The circuit element may be provided with a pair of varactor diodes which are used to form the antenna tuning circuit. The varactor diodes are serially connected to each other in facing relation such that a neutral point is established between the pair of varactor diodes. The neutral point is further connected to the positive or negative electrode of the wireless set circuit.

When both the case and the back lid of the wireless set body are formed of conductive material, the conductive material is connected to the positive or negative electrode of the wireless set circuit. In this configuration, a discharge path for static electricity may be formed between the intermediate fastening member and the member formed of conductive material through the varactor diodes.

When static electricity enters the loop antenna from the intermediate fastening member upon the contact with the human body, the static electricity is discharged to the grounded side of the receiver through the discharge path including the varactor diodes. Since the discharge path requires only minimum additional circuit elements, which permit the capacitance of the antenna tuning circuit to not fluctuate, so that the antenna characteristics will not be affected.

In another embodiment, the discharge path for removing the static electricity entering from the human body may be eliminated by a spark gap. The spark gap may be formed between the pair of antenna parts jointly forming the loop antenna. In another embodiment, the spark gap may be formed between each of the antenna parts and a positive or negative electrode of a power supply for the wireless set circuit. In the wrist-fitted wireless set formed with conductive material which contacts the human body, the spark gap may be formed between the portion formed of conductive material and each of the antenna parts.

Accordingly, a paging device has been provided with a structure that prevents a decline in sensitivity of the receiver caused by a contact of the receiver with the human body. Further, the structure prevents the adverse intrusion of static electricity into the device.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A paging device for mounting to a user's body and for at least one of receiving and transmitting signals and including a battery power source having positive and negative terminals comprising:

pager circuit means for controlling and operating at least one of the received signals and the transmitted signals; and a pager body, having at least a portion formed of a conductive material, said pager body housing the pager circuit means and engaging the user's body when mounted, said pager body being operatively coupled to said pager circuit means, the conductive portion of the pager body being operatively coupled to one of the positive and negative terminals of said battery power source so that the pager circuit means is set to an AC reference voltage at least when the conductive portion is mounted to and engaged against the user's body.

2. The paging device of claim 1, wherein the pager body includes a top case and a back lid.

3. The paging device of claim 2, wherein the portion of the pager body formed of conductive material is at least one of the top case and the back lid.

4. The paging device of claim 2, wherein the portion formed of conductive material is the back lid.

5. The paging device of claim 1, wherein the pager circuit means includes a ground electrode, said conductive portion of the pager body being operatively coupled to the ground electrode.

6. The paging device of claim 3, wherein the pager circuit means includes a ground electrode, said conductive portion of the pager body being operatively coupled to the ground electrode.

7. The paging device of claim 5, wherein the conductive portion of the pager body is directly connected to the ground electrode.

8. The paging device of claim 5, wherein the conductive portion of the pager body is indirectly connected to the ground electrode.

9. The paging device of claim 1, and including band means coupled to the pager body for mounting the paging device to the user's body, the band means including at least two band portions each having a first end and a second end, the first ends of the band portions being coupled to the pager body.

10. The paging device of claim 9, wherein the band portions each include antenna portion means coupled to the pager circuit means for at least one of receiving and transmitting signals and built into the respective band portions.

11. The paging device of claim 10, wherein the antenna portion means are formed from a conductive material.

12. The paging device of claim 11, further including fastening means for mechanically coupling the second ends of the band portions and electronically coupling the antenna portion means.

13. The paging device of claim 12, wherein the pager body is mounted on the user's body by the band means so that the built in antenna means is electrically coupled to form a loop antenna.

14. The paging device of claim 13, including a setting means for setting the conduction portion of the pager body to an AC reference voltage of the pager circuit means and including a balanced circuit section coupled in parallel with the ends of said antenna portion means coupled to the pager circuit means and having an essentially neutral point, said neutral point of said balanced circuit section being operatively coupled to said AC reference voltage of said pager circuit means.

15. The paging device of claim 14, wherein the pager body includes a top case and a back lid.

16. The paging device of claim 15, wherein the portion of the pager body formed of conductive material is at least one of the top case and the back lid.

17. The paging device of claim 14, wherein the fastening means is electrically coupled to the essentially neutral point of the balanced circuit section for the discharge of static electricity.

18. The paging device of claim 16, wherein the fastening means is electrically coupled to the essentially neutral point of the balanced circuit section for the discharge of static electricity.

19. The paging device of claim 18, wherein the setting means operatively couples the essentially neutral point of the balanced circuit section to the same one of the positive and negative terminals of the battery power source as the conductive portion of the pager body is connected.

20. The paging device of claim 19, wherein the balanced circuit section includes a pair of varactor diodes connected at their respective cathodes to define said essentially neutral point and connected in parallel with said antenna portion means.

21. The paging device of claim 20, and including a pair of capacitors one connected between each of the junctions between the pager circuit means and the respective ends of the antenna portion means and the balanced circuit section.

22. The paging device of claim 21, and including tuning frequency control voltage means for applying a tuning frequency control voltage to one of the junctions between the respective ends of the antenna portion means and the balanced circuit section.

23. The paging device of claim 22, wherein said tuning frequency control voltage is applied to both junctions between said balanced circuit section and the ends of said antenna portion means.

24. The paging device of claim 20, and including frequency control voltage means coupled to the essentially neutral point of the balanced circuit section and including capacitor means coupled intermediate said essentially neutral point and said one of said positive and negative terminals of the battery power source.

25. The paging device of claim 22, and including spark gap means coupled between both junctions of said balanced circuit section and said antenna portion means and between each of said junctions and said at least one of the positive and negative terminals of the battery power source.

26. The paging device of claim 19, wherein the band means is adapted to be fitted around a wrist of the user with the conductive portion of the pager body in contact with said wrist.

27. The paging device of claim 9, wherein the band means is adapted to be fitted around a wrist of the user with the conductive portion of the pager body in contact with said wrist.

28. The paging device of claim 1, further including band means adapted to be fitted around a wrist of the user with the conductive portion of the pager body in contact with said wrist.

29. A paging device for mounting to the user's body and for at least one of receiving and transmitting signals comprising:

pager circuit means for controlling and operating on at least one of the received signals and the signals to be transmitted;

a pager body housing the pager circuit means;

band means including two band portions having first ends and second ends, the respective first ends of the band portions being coupled to the pager body for mounting to a user;

antenna means for at least one of receiving and transmitting the signals and including antenna portion means, one being built into each band portion;

fastening means for mechanically coupling the second ends of the band portions and electrically coupling the two antenna portion means so that a loop antenna is formed when the pager body is mounted by the fastened band means;

circuit element means connected in parallel to the loop antenna, the circuit element means having a capacitance to resonate with the loop antenna to form a tuning circuit;

a battery power source operatively coupled to said pager circuit means and having positive and negative electrodes; and said circuit element means being operatively coupled to one of the positive or negative electrodes of the battery power source;

whereby a discharge path for removing static electricity is formed between said fastening means and either said positive electrode or said negative electrode through said circuit element means.

30. The paging device of claim 29, wherein the circuit element means is coupled to a positive electrode of said battery power source.

31. The paging device of claim 29, wherein the circuit element means is coupled to a negative electrode of said battery power source.

32. The paging device of claim 29, wherein the circuit element means includes a pair of varactor diodes connected at their respective cathodes and connected in parallel with said loop antenna, whereby said circuit element means has a capacitance to form an antenna tuning circuit.

33. The paging device of claim 32, wherein said pair of varactor diodes includes an essentially neutral point formed between the pair of varactor diodes and operatively coupled to the one of the electrodes.

34. The paging device of claim 33, and including a pair of capacitors one connected between the pager circuit means and each of the junctions between the end of the antenna portion means at the pager body and the pair of varactor diodes.

35. The paging device of claim 34, and including tuning frequency control voltage means for applying a tuning frequency control voltage to one of the junctions between the respective ends of the antenna portion means and the pair of varactor diodes.

36. The paging device of claim 35, wherein said tuning frequency control voltage is applied to both junctions between said pair of varactor diodes and the ends of said antenna portion means.

37. The paging device of claim 34, and including frequency control voltage means coupled to the essentially neutral point of the pair of varactor diodes and including capacitor means coupled intermediate said essentially neutral point and said one of said positive and negative terminals of the battery power source.

38. The paging device of claim 33, and including tuning frequency control voltage means for applying a tuning frequency control voltage to one of the junctions between the respective ends of the antenna portion means and the pair of varactor diodes.

39. The paging device of claim 38, wherein said tuning frequency control voltage is applied to both junctions of said pair of varactor diodes and the ends of said antenna portion means.

40. The paging device of claim 38, and including frequency control voltage means coupled to the essentially neutral point of the pair of varactor diodes and including capacitor means coupled intermediate to said essentially neutral point and said one of said positive and negative terminals of the battery power source.

41. The paging device of claim 33, and including spark gap means coupled between both junctions of said pair of varactor diodes and said antenna portion means, and between each of said junctions and said at least one of the positive and negative terminals of the battery power source.

42. The paging device of claim 33, wherein the band means is adapted to be fitted around a wrist of the user with the conductive portion of the pager body in contact with said wrist.

43. The paging device of claim 29, wherein the band means is adapted to be fitted around a wrist of the user with the conductive portion of the pager body in contact with said wrist.

44. The paging device of claim 29, wherein the pager body includes a top case and a back lid.

45. The paging device of claim 35, wherein at least one of the top case and the back lid is formed with at least a portion formed of a conductive material and in engagement with the user's body when mounted thereon.

46. The paging device of claim 45, said conductive material is operatively coupled to one of the positive and negative electrodes of the battery power source.

47. The paging device of claim 46, wherein a discharge path for removing static electricity is formed from the fastening means to the portion formed of conductive material through the circuit element means.

48. The paging device of claim 47, wherein the circuit element means includes a pair of varactor diodes serially connected with their respective anodes connected together to define an essentially neutral point, the pair of varactor diodes being coupled in parallel with the loop antenna.

49. The paging device of claim 48, wherein the discharge path for removing static electricity is formed from the conductive material to the fastening means through the varactor diodes.

50. The paging device of claim 49, wherein the band means is adapted to be fitted around a wrist of the user with the conductive portion of the pager body in contact with said wrist.

51. A paging device for mounting to the user's body and for at least one of receiving and transmitting signals comprising:

pager circuit means for controlling and operating on at least one the received signals and the signals to be transmitted;

a pager body housing the control means;

band means including two band portions having first ends and second ends, the respective first ends of the band portions being coupled to the pager body for mounting to a user;

antenna means having a first section and a second section built into the band means for at least one of receiving and transmitting the signals, the antenna sections being formed of a conductive material carried by the band portions;

fastening means for mechanically connecting the second ends of the band portions and electrically coupling the first section and the second section of the antenna means so that a loop antenna is formed when the pager body is mounted on the user; and discharge path means including a spark gap electrically coupled to the loop antenna for removing static electricity.

52. The paging device of claim 51, wherein the spark gap is formed between the ends of the first and second antenna sections at the pager body.

53. The paging device of claim 51, further including power supply means for supplying power to the pager circuit means positioned in the body and including positive and negative electrodes.

54. The paging device of claim 53, wherein the spark gap is formed between the first section and second section of the antenna means and one of the positive and negative electrodes of the power supply means.

55. The paging device of claim 51, wherein the pager body is formed at least in part of a conductive material in contact with the user's body when mounted.

56. The paging device of claim 55, wherein the spark gap is formed between the portion of the pager body formed of conductive material and each of the first sections and second sections of the antenna means.

57. The paging device of claim 56, wherein the pager body includes a top case and a back lid.

58. The paging device of claim 57, wherein the portion formed of conductive material is at least one of the top case and the back lid.

59. The paging device of claim 58, wherein the conductive material is positioned to contact the wrist of the user, the band means being a wristband.

60. The paging device of claim 51, wherein the pager circuit means includes a plurality of multi-layered circuit boards to form a multi-layered structure, the spark gap being formed between at least two circuit boards stacked in spaced relation one upon the other.

61. The paging device of claim 60, wherein the circuit boards have conductive pattern means thereon, the spark gap being defined by at least two projecting point portions facing one another, each being coupled to the conductive pattern means of its circuit board.

62. The paging device of claim 55, wherein the pager circuit means includes at least one circuit board having a conductive circuit layer on at least one surface thereof.

63. The paging device of claim 62, further including a through hole bored through said circuit board, said conductive circuit layer being on both sides of said circuit board and defining an electrode pattern including tip portions in registration pointed towards the through hole to form a spark gap between registered tip portion on opposed sides of the circuit board through the through hole.

64. The paging device of claim 62, wherein said conductive circuit layer on one side of the board defines facing tip portions defining a spark gap.

65. The paging device of claim 53, and including a first spark gap formed between the ends of the antenna portions at the pager body and second and third spark gaps respectively formed between the end of each of the antenna sections at the pager body and one of the positive and negative electrodes of the power supply means.

66. The paging device of claim 65, and including circuit element means connected in parallel to the loop antenna, the circuit element means having a capacitance to resonate with the loop antenna to form a tuning circuit and further defining an essentially neutral point operatively coupled to one of said positive and negative electrodes.

67. The paging device of claim 66, wherein the pager body includes at least a conductive portion which is positioned to contact the body of the user when mounted, said conductive portion being operatively coupled to said one of said positive and negative electrodes.

68. The paging device of claim 62, and including an antenna terminal operatively coupled to each of said antenna sections and to the conductive circuit layer on said circuit board and including means for mechanically supporting said antenna terminal on said circuit board, each said antenna terminal including a first portion for coupling to its associated antenna portion, a second portion for electrically and mechanical coupling to said circuit board and a third portion facing an edge of said circuit board, said circuit board including a conductive layer on said edge facing said third portion of said antenna terminal, a spark gap being defined between said conductive layer on said circuit board edge and said third portion of said antenna terminal.

69. A paging device for mounting to the user's body and for at least one of receiving and transmitting signals comprising:

pager circuit means for controlling and operating on at least one of the received signals and the signals to be transmitted, and having a first connection side and a second connection side;

a pager body housing the pager circuit means, at least a portion of the pager body being formed of a conductive material and being in contact with the user's body when mounted;

a band including two band portions each having a first end and a second end, the first ends of the band portions being coupled to the pager body for mounting to the user;

antenna means for at least one of receiving and transmitting the signals and formed from first and second antenna sections each respectively built into one of the two band portions;

fastening means for mechanically connecting the second ends of the band portions and electrically coupling the antenna sections so that a loop antenna is formed when the pager body is mounted on the user;

a pair of spark gaps connected in parallel to the loop antenna and in parallel to the pager circuit means on the first connection side thereof, an essentially neutral point representing the ground potential being defined between the two spark gaps; and a dedicated wiring pattern electrically coupling the neutral point and the conductive portion of the pager body.

70. The paging device of claim 69, wherein the neutral point is connected to a back lid of the body.

71. A paging device for mounting to the user's body and for at least one of receiving and transmitting signals comprising:

pager circuit means for controlling and operating on at least one of the received signals and the signals to be transmitted, and having a first connection side and a second connection side;

a pager body housing the pager circuit means, at least a portion of the pager body being formed of a conductive material and being in contact with the user's body when mounted;

a band including two band portions each having a first end and a second end, the first ends of the band portions being coupled to the pager body for mounting to the user;

antenna means for at least one of receiving and transmitting the signals and formed from first and second antenna sections each respectively built into one of the two band portions;

fastening means for mechanically connecting the second ends of the band portions and electrically coupling the antenna sections so that a loop antenna is formed when the pager body is mounted on the user;

a pair of spark gaps connected in parallel to the loop antenna and in parallel to the pager circuit means on the first connection side thereof, an essentially neutral point representing the ground potential being defined between the two spark gaps;

battery power source operatively coupled to said pager circuit means and having positive and negative electrodes;

circuit means operatively coupling the conductive portion of the pager body and at least one of said positive and negative electrodes;

a dedicated wiring pattern electrically coupling the neutral point to the circuit means coupling the conductive portion of the pager body and one of the positive and negative electrodes; and decoupling means electrically coupled to the second connection side of the pager circuit means and the positive and negative electrodes of the battery power source for isolating the pager and the conductive portion of the pager body.

72. The paging device of claim 71, wherein the back lid is conductive and connects to the negative electrode.

73. The paging device of claim 71, wherein said decoupling means is a filter.

* * * * *